US008418859B2

(12) United States Patent
Chen

(10) Patent No.: US 8,418,859 B2
(45) Date of Patent: Apr. 16, 2013

(54) SPIRAL TYPE CAP-SHAPED OBJECT RACK

(76) Inventor: Fang-Yin Chen, Taichung County (TW)

( * ) Notice: Subject to any disclaimer, the term of this patent is extended or adjusted under 35 U.S.C. 154(b) by 143 days.

(21) Appl. No.: 12/898,925

(22) Filed: Oct. 6, 2010

(65) Prior Publication Data

US 2012/0085716 A1 Apr. 12, 2012

(51) Int. Cl.
*A47F 1/06* (2006.01)
*A47G 23/02* (2006.01)

(52) U.S. Cl.
USPC .......................................... 211/59.2; 248/153

(58) Field of Classification Search ................. 211/13.1, 211/41.4, 59.2, 85.31, 126.9, 133.1, 133.2, 211/133.3, 133.4, 133.5, 181.1, 196, 205; 221/155, 194, 312 R; 248/154, 175; 273/112, 273/118 R, 119 R, 119 A, 121 R, 121 A, 273/127 R, 127 B, 127 C; 312/45, 49, 72; D6/458, 459, 460, 462, 463, 464, 566; D7/600.1–600.4, 704
See application file for complete search history.

(56) References Cited

U.S. PATENT DOCUMENTS

| | | | | |
|---|---|---|---|---|
| 2,119,700 A | * | 6/1938 | Burgess | 211/59.2 |
| 2,299,403 A | * | 10/1942 | Mozel | 312/49 |
| 2,525,261 A | * | 10/1950 | Henderson | 221/150 R |
| 2,692,053 A | * | 10/1954 | Calhoun et al. | 211/59.2 |
| 2,843,985 A | * | 7/1958 | Ritzenberg | 53/235 |
| D187,834 S | * | 5/1960 | Tirlet | D6/463 |
| 3,265,246 A | * | 8/1966 | Messenger | 221/283 |
| 3,464,700 A | * | 9/1969 | Clatterbuck | 273/119 R |
| 4,120,501 A | * | 10/1978 | Atherton | 273/120 R |
| 4,175,665 A | * | 11/1979 | Dogliotti | 211/59.2 |
| 5,358,241 A | * | 10/1994 | Anghelo et al. | 273/118 R |
| 5,632,482 A | * | 5/1997 | Anghelo | 273/121 R |
| 5,833,117 A | * | 11/1998 | Kovens et al. | 221/24 |
| 5,897,022 A | * | 4/1999 | Mann | 221/24 |
| 6,866,616 B2 | * | 3/2005 | Sommer | 482/110 |
| D625,570 S | * | 10/2010 | Melocchi | D7/704 |
| D627,988 S | * | 11/2010 | Chapman et al. | D6/462 |
| D653,503 S | * | 2/2012 | Chen | D7/600.1 |
| 2012/0006770 A1 | * | 1/2012 | Chen | 211/59.2 |

* cited by examiner

*Primary Examiner* — Jonathan Liu
*Assistant Examiner* — Joshua Rodden
(74) *Attorney, Agent, or Firm* — Rosenberg, Klein & Lee

(57) ABSTRACT

A spiral type cap-shaped object rack includes an upright stand, and a spiral carrier frame unit comprising an outer wire rod spirally extending around the upright stand, a plurality of inner wire rods spirally extending around the upright stand and spaced between the upright stand and the outer wire rod in a parallel manner at a lower elevation relative to the outer wire rod and a plurality of connection wire rods transversely connecting the outer wire rod and the inner wire rods to the upright stand.

4 Claims, 7 Drawing Sheets

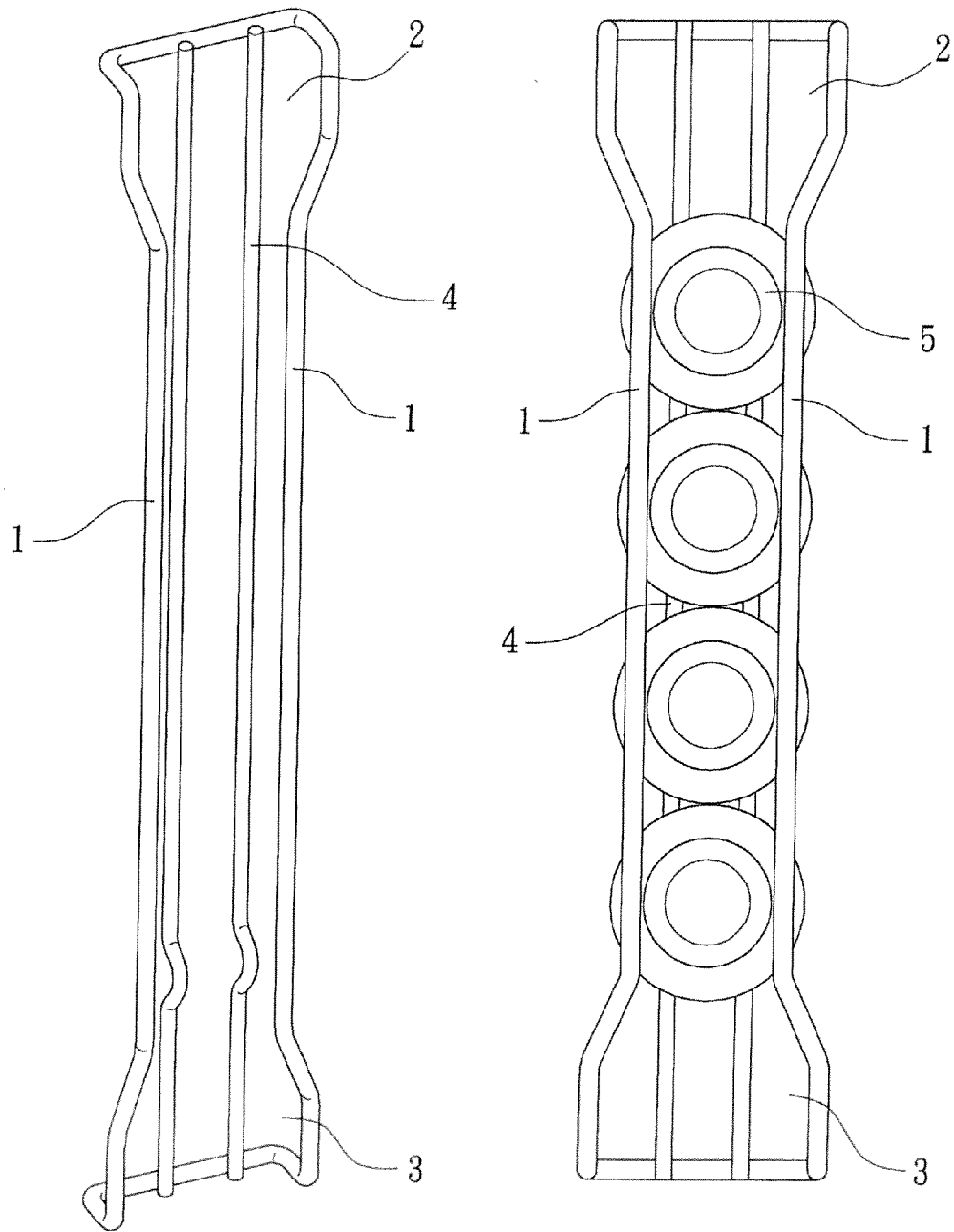
PRIOR ART
FIG. 1
PRIOR ART
FIG. 2

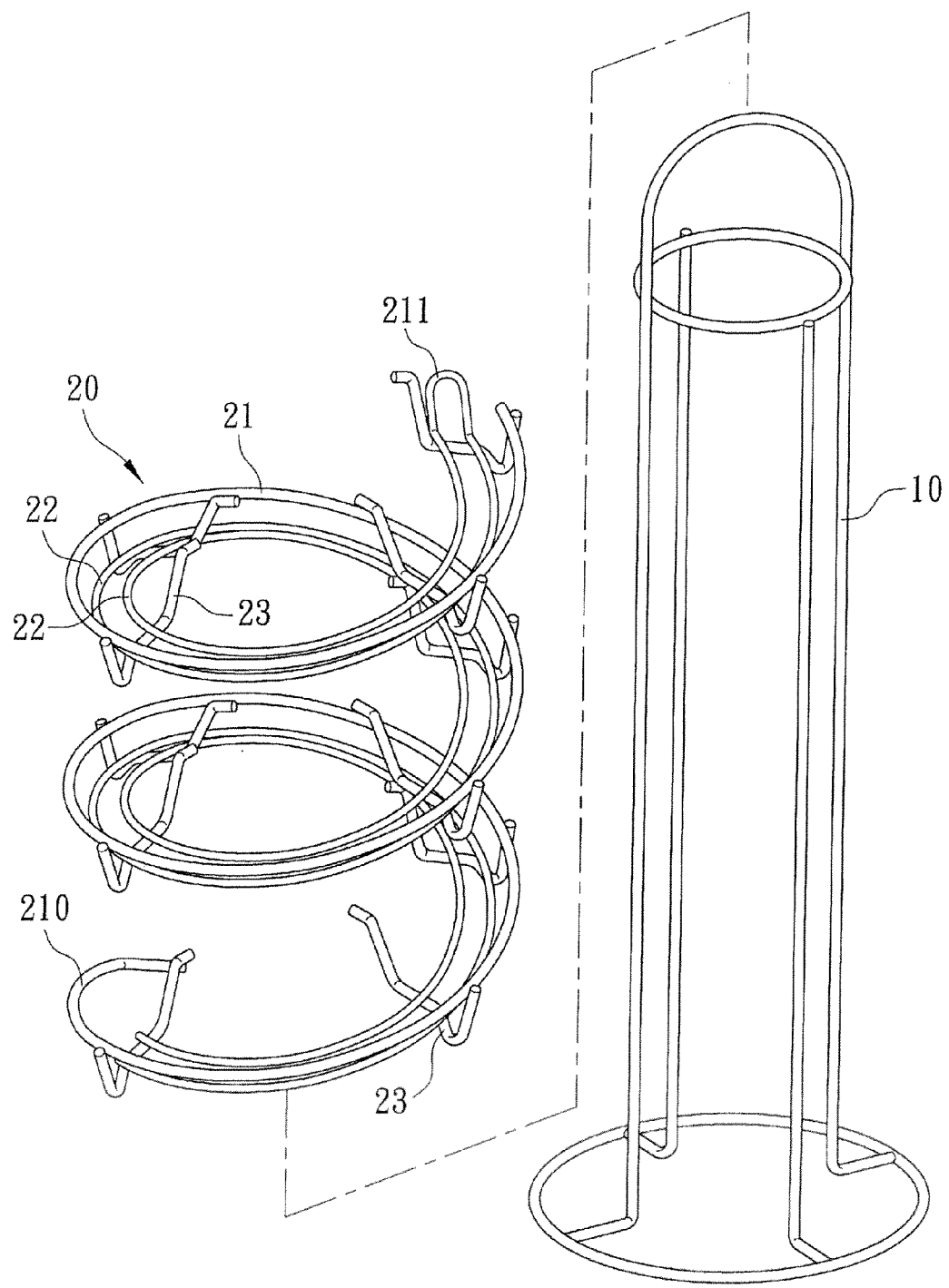
FIG. 3

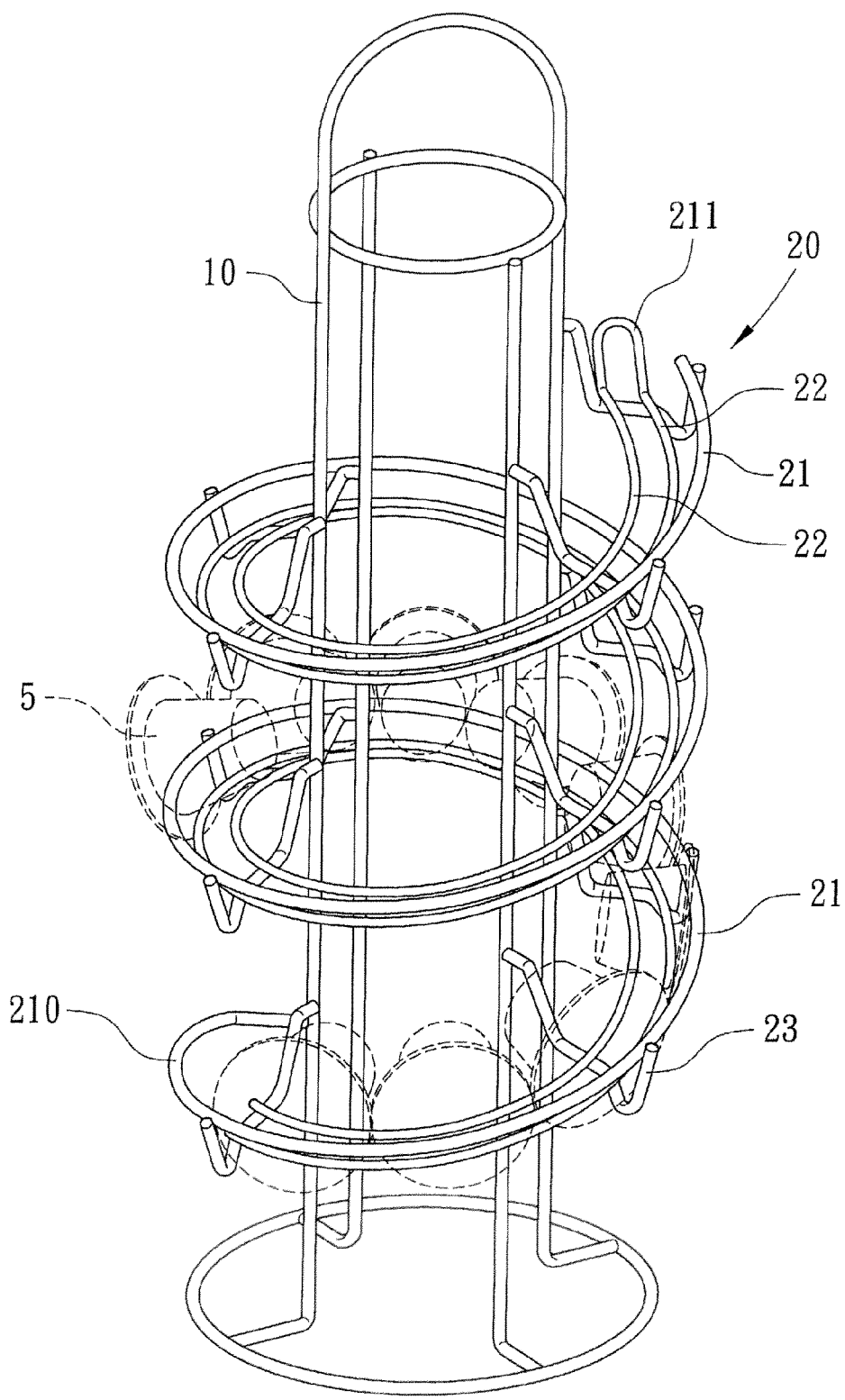
FIG. 4

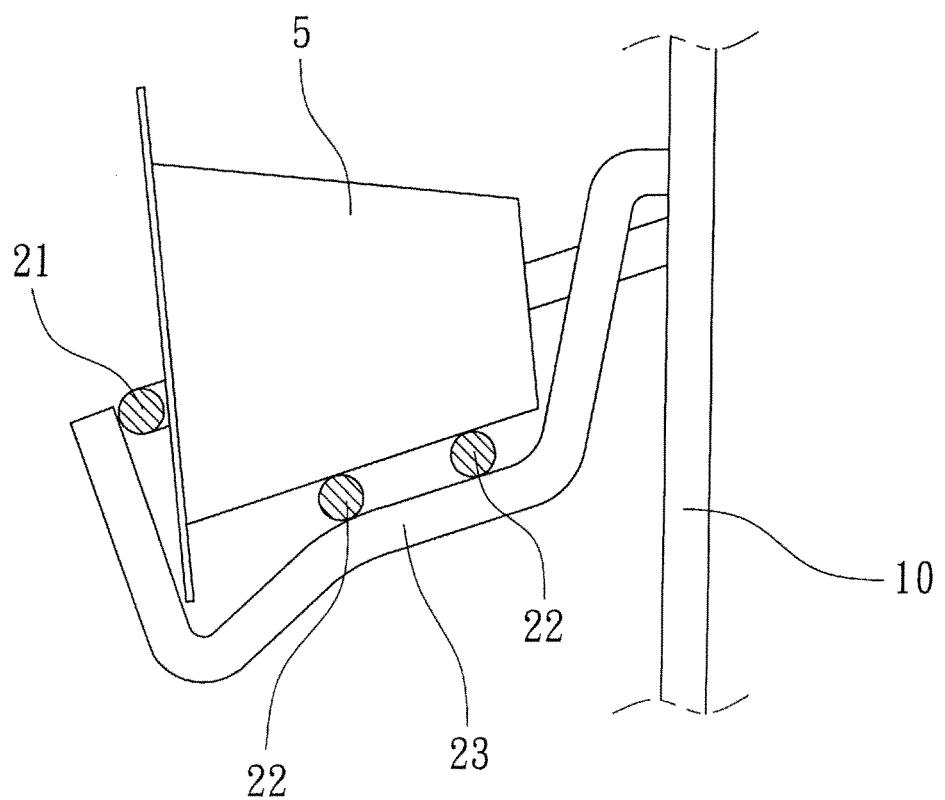
FIG. 5

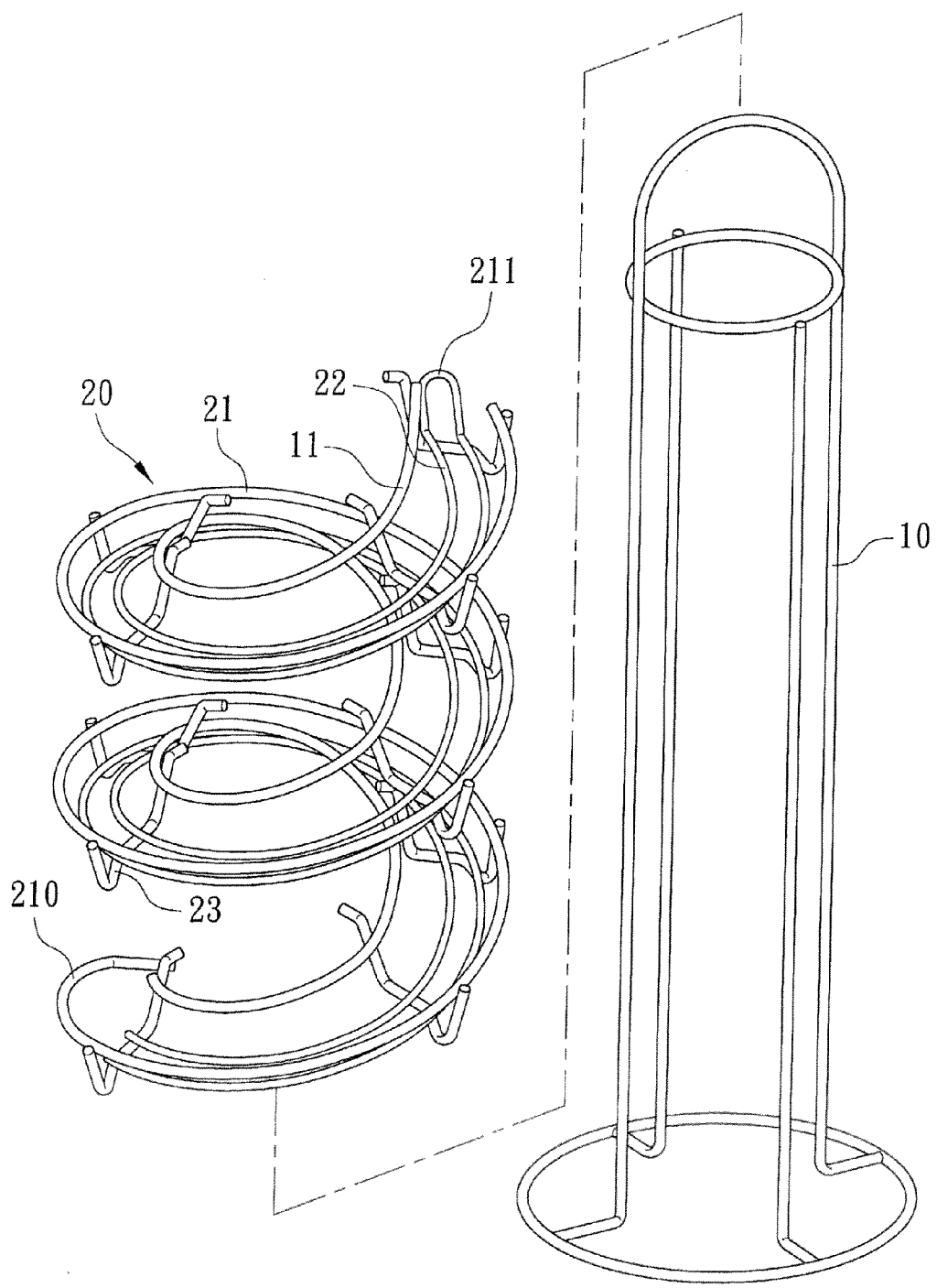
FIG. 6

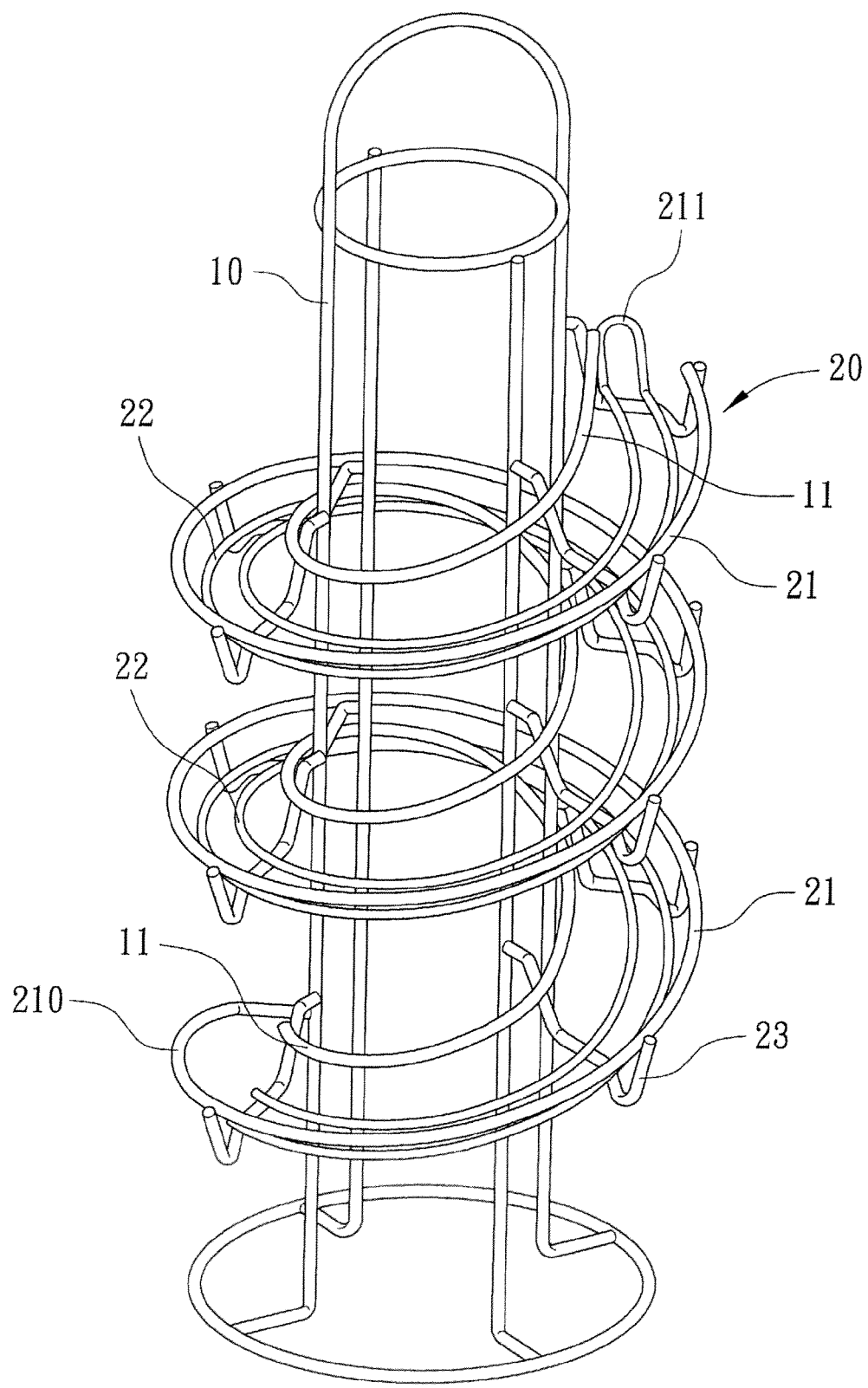
FIG. 7

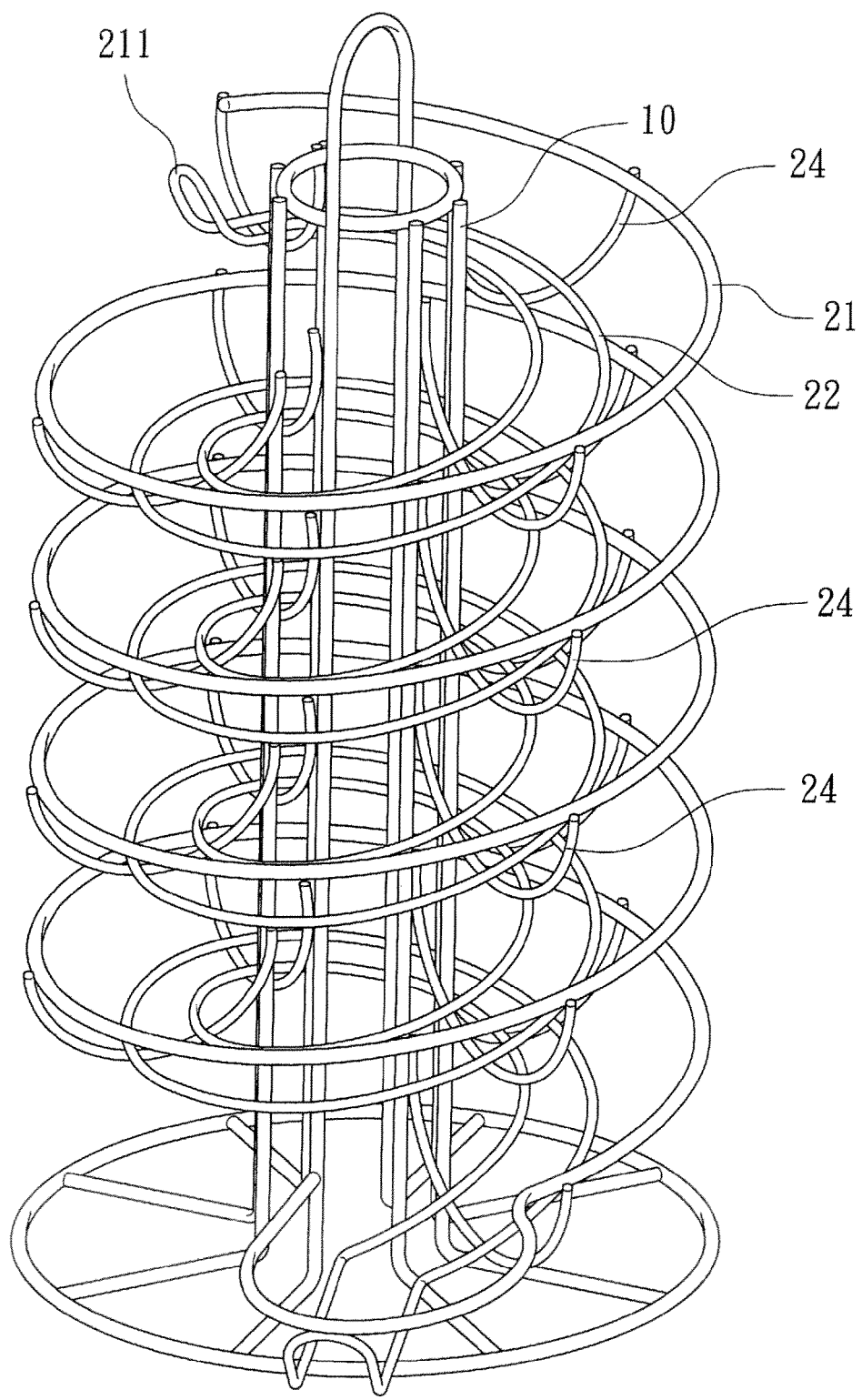
FIG. 8

SPIRAL TYPE CAP-SHAPED OBJECT RACK

BACKGROUND OF THE INVENTION

1. Field of the Invention

The present invention relates to a rack for holding cap-shaped objects and more particularly, to a spiral type cap-shaped object rack, which facilitates loading and unloading of cap-shaped objects.

2. Description of the Related Art

A conventional cap-shaped object rack for holding cap-shaped objects (such as cap-shaped milk ball, cap-shaped coffee powder ball, etc.), as shown in FIGS. 1 and 2, comprises two upright side rods 1, two back support rods 4 arranged in a parallel manner between the two upright side rods 1 for supporting every storage cap-shaped object 5 between the two upright side rods 1, a top open space 2 through which cap-shaped objects 5 are inserted one after another into the space between the two upright side rods 1, and a bottom open space 3 through which every storage cap-shaped object 5 is taken out of the space between the upright side rods 1.

This design of cap-shaped object rack has drawbacks: (1) the design of the straight upright side rods 1 is monotonous; (2) storage cap-shaped object 5 must be inserted into the rack through the top open space 2 or taken out of the rack through the bottom open space 3, i.e., the user cannot insert storage cap-shaped object 5 into the rack or take storage cap-shaped object 5 out of the rack through the middle part of the rack.

SUMMARY OF THE INVENTION

The present invention has been accomplished under the circumstances in view. It is one object of the present invention to provide a spiral type cap-shaped object rack, which facilitates loading and unloading of cap-shaped objects.

To achieve this and other objects of the present invention, a spiral type cap-shaped object rack comprises an upright stand, and a spiral carrier frame unit spirally bonded to the upright stand. The spiral carrier frame unit comprises an outer wire rod spirally extending around the upright stand, a plurality of inner wire rods spirally extending around the upright stand and spaced between the upright stand and the outer wire rod in a parallel manner at a lower elevation relative to the outer wire rod and a plurality of connection wire rods transversely connecting the outer wire rod and the inner wire rods to the upright stand.

BRIEF DESCRIPTION OF THE DRAWINGS

FIG. 1 is an elevational view of a cap-shaped object rack according to the prior art.

FIG. 2 illustrates a status of use of the cap-shaped object rack according to the prior art.

FIG. 3 is an exploded view of a spiral type cap-shaped object rack in accordance with the present invention.

FIG. 4 is an elevational assembly view of the spiral type cap-shaped object rack in accordance with the present invention.

FIG. 5 is a sectional side view of the present invention, showing a cap-shaped object held in the spiral type cap-shaped object rack.

FIG. 6 is an exploded view of an alternate form of the spiral type cap-shaped object rack in accordance with the present invention.

FIG. 7 is an elevational assembly view of the spiral type cap-shaped object rack shown in FIG. 6.

FIG. 8 is an elevational assembly view of another alternate form of the spiral type cap-shaped object rack in accordance with the present invention.

DETAILED DESCRIPTION OF THE PREFERRED EMBODIMENT

Referring to FIGS. 3-5, a spiral type cap-shaped object rack in accordance with the present invention is made by directly bending a metal wire rod into shape, comprising an upright stand 10 and a spiral carrier frame unit 20 bonded (soldered) to the upright stand 10. The spiral carrier frame unit 20 comprises an outer wire rod 21 spirally extending around the upright stand 10, a plurality of inner wire rods 22 spirally extending around the upright stand 10 and spaced between the upright stand 10 and the outer wire rod 21 in a parallel manner at a lower elevation relative to the outer wire rod 21, a plurality of connection wire rods 23 transversely connecting the outer wire rod 21 and the inner wire rods 22 to the upright stand 10, a hooked top stop wire rod 211 located on the top end thereof, and a bottom stop wire rod 210 located on the bottom end thereof. Thus, the outer wire rod 21 and the inner wire rods 22 define a spiral storage space around the upright stand 10 between the top stop wire rod 211 and the bottom stop wire rod 210 for storing cap-shaped objects 5.

Thus, the spiral type cap-shaped object rack has the advantages: (1) as shown in FIG. 5, cap-shaped objects 5 can be carried on the inner wire rods 22 and held in the spiral carrier frame unit 20 by the outer wire rod 21; (2) as shown in FIG. 4, the spiral design of the spiral carrier frame unit 20 can carry a big amount of cap-shaped objects 5; (3) as shown in FIG. 4 the spiral storage space defined by the outer wire rod 21 and the inner wire rods 22 around the upright stand 10 is a top-open storage space and the user can access to the spiral storage space from the top side at any selected location for storing or taking out cap-shaped objects 5; (4) when the user takes any storage cap-shaped object 5 from the spiral storage space, the other upper storage cap-shaped objects 5 will slide downwards along the spiral storage space and will be automatically kept in a good order.

FIGS. 6 and 7 illustrate an alternate form of the present invention. According to this alternate form, a supplementary spiral wire rod 11 is bonded to the connection wire rods 23 to reinforce the structural strength of the spiral carrier frame unit 20 and to prohibit the storage cap-shaped objects 5 from falling out of the spiral carrier frame unit 20.

FIG. 8 illustrates another alternate form of the present invention. According to this embodiment, the connection wire rods, referenced by 24, that connect the outer wire rod 21 and the inner wire rods 22 are smoothly arched for holding, for example, eggs.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A spiral type cap-shaped object rack, comprising:
an upright stand; and
a spiral carrier frame unit encompassing an outer periphery of said upright stand and coupled thereto to define a spiral passage and storage space for cap-shaped objects, said spiral carrier frame unit including (a) an outer wire rod spirally extending around said upright stand, (b) a plurality of inner wire rods spirally extending around said upright stand and spaced between said upright stand and said outer wire rod in a parallel manner at a lower elevation relative to said outer wire rod and (c) a plurality of connection wire rods, each of said connection wire rods transversely interconnecting said outer wire rod with said inner wire rods and connecting to said upright stand, each of said plurality of connection wire rods extending angularly downwardly to thereby transversely cant said spiral passage, said plurality of inner wire rods being angled upwardly and joined together at an upper end of said spiral carrier frame unit to form an upper stop, said outer wire being arcuately formed at a lower end of said spiral carrier frame and coupled to one of a lowermost one of said plurality of connection wire rods or said upright stand to form a lower stop.

2. The spiral type cap-shaped object rack as claimed in claim 1, wherein said lower stop further comprises upwardly bent portions of said plurality of inner wire rods being joined together at said lower end of said spiral carrier frame unit.

3. The spiral type cap-shaped object rack as claimed in claim 1, wherein said spiral carrier frame unit further comprises a supplementary spiral wire rod bonded to said connection wire rods and extending around said upright stand to reinforce the structural strength of said spiral carrier frame unit.

4. The spiral type cap-shaped object rack as claimed in claim 1, wherein said connection wire rods are smoothly arched.

* * * * *